Sept. 26, 1961   A. J. FREI   3,001,381
FREEZING DEVICE
Filed Feb. 17, 1960   2 Sheets-Sheet 1

INVENTOR.
Arthur J. Frei
BY Lloyd M. Keighley
His Attorney

Sept. 26, 1961    A. J. FREI    3,001,381
FREEZING DEVICE
Filed Feb. 17, 1960    2 Sheets-Sheet 2

INVENTOR.
Arthur J. Frei
BY
Lloyd M. Keighley
His Attorney

3,001,381
FREEZING DEVICE

Arthur J. Frei, Dayton, Ohio, assignor to General Motors Corporation, Detroit, Mich., a corporation of Delaware
Filed Feb. 17, 1960, Ser. No. 9,244
1 Claim. (Cl. 62—355)

This invention relates to freezing devices of the tray and grid type ordinarily supplied and used in conjunction with a household refrigerator cabinet.

An object of my invention is to provide a freezing device of the tray and grid type which, when used in one fashion, will produce ice blocks for table use and, when used in another fashion, will produce flavored ice pieces or so-called popsicles on throw away stick elements.

Another object of my invention is to convert a conventional freezing device in which ice blocks are made for table use into a freezing device for producing flavored ice pieces in the form of so-called popsicles.

A further object of my invention is to provide a removable accessory attachment for an ice block freezing device of the tray and grid type commonly employed in household refrigerators to freeze flavored ice pieces in the device on sticks which attachment will not interfere with tilting walls of the grid of the device to loosen ice pieces therefrom and from walls of the tray.

In carrying out the foregoing objects, it is a still further and more specific object of my invention to arrange nonmetallic throw away stick-like elements on a removable plate attachment applied to a tray and grid type freezing device so that one end of the elements serve as a finger receiving handle on ice pieces frozen in the device for detaching the elements from a removable unit portion of the device whereby ice pieces may be individually disengaged from the removed unit after the ice pieces have been loosened from walls of the device.

Further objects and advantages of the present invention will be apparent from the following description, reference being had to the accompanying drawings wherein a preferred embodiment of the present invention is clearly shown.

Figure 4:
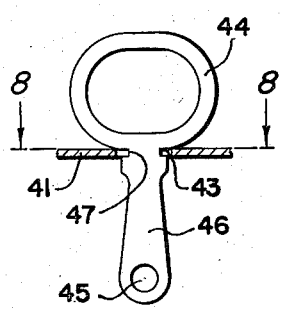
FIGURE 4 is an enlarged fragmentary sectional view taken on the line 4—4 of FIGURE 2 showing a detachable interlock of a stick-like element in a slot provided in the attachment plate removably associated with the freezing device.
Figure 7:
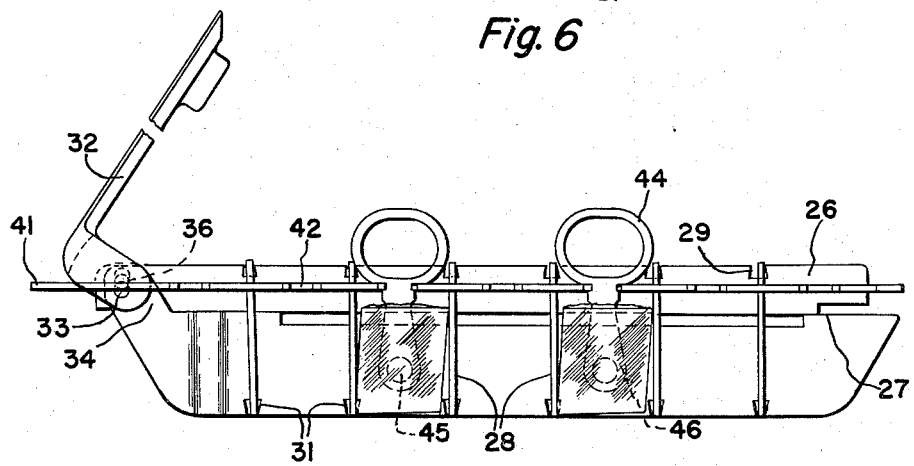
Figure 8:
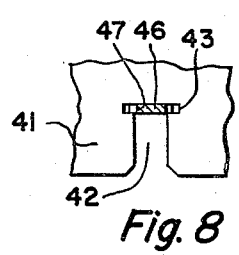

FIGURE 7 is a view showing the grid and the accessory attachment plate therefor together with loosened ice pieces bonded to stick-like elements removed as a unit from the tray of the freezing device and showing some of the ice pieces disengaged from the unit; and FIGURE 8 is a sectional view taken on the line 8—8 of FIGURE 4 showing one of a plurality of hanger means or slots provided in the plate of the accessory attachment for the freezing device.

Figure 1:
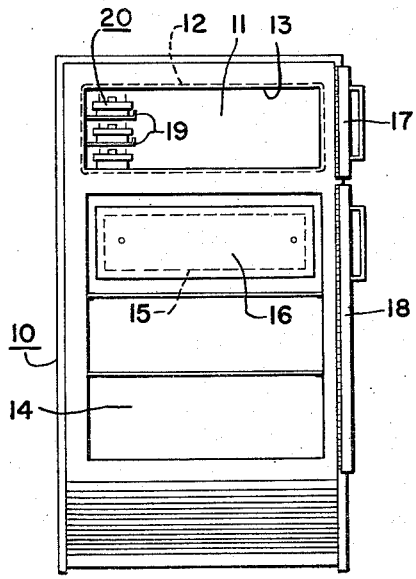
FIGURE 1 is a front view of a multiple chambered household refrigerator with the chamber doors shown in open position disclosing freezing devices of my present invention located in a freezing chamber of the refrigerator.

Referring to the drawings, wherein the invention is illustrated, I show in FIGURE 1 thereof a refrigerating apparatus including an insulated household refrigerator cabinet 10 of the multiple chambered type in which the present invention is embodied. Cabinet 10 is provided with an upper food chamber 11 which is cooled to a temperature well below 30° F. for the storage of frozen foods, for freezing foods and/or for freezing a liquid in freezing devices removably placed therein. Chamber 11 is refrigerated by an evaporator 12, of a refrigerating system associated with the refrigerator 10, which evaporator is in the form of a conduit coiled or wrapped around the outside of and secured to a metal can-like member 13 forming the liner of chamber 11. Cabinet 10 is also provided with a second or lower food storage chamber 14 which is cooled to a temperature of from, for example, 37° to 43° F., by a sheet metal plate-like evaporator 15, of the refrigerating system associated with the refrigerator, which evaporator is mounted on and spaced from the back wall of chamber 14 behind a protective cover or baffle plate 16. Insulated doors 17 and 18 are hingedly mounted upon cabinet 10 and provide individual closures for the access opening of chambers 11 and 14 respectively. A plurality of freezing devices, generally represented by the reference numeral 20 and shown more clearly in other figures of the drawings, are supported on the bottom of liner 13 or on shelves 19 within the freezing chamber 11 and water or a flavored liquid contained in compartments of these devices is adapted to be frozen into separated ice blocks or pieces of flavored ice.

Figure 2:
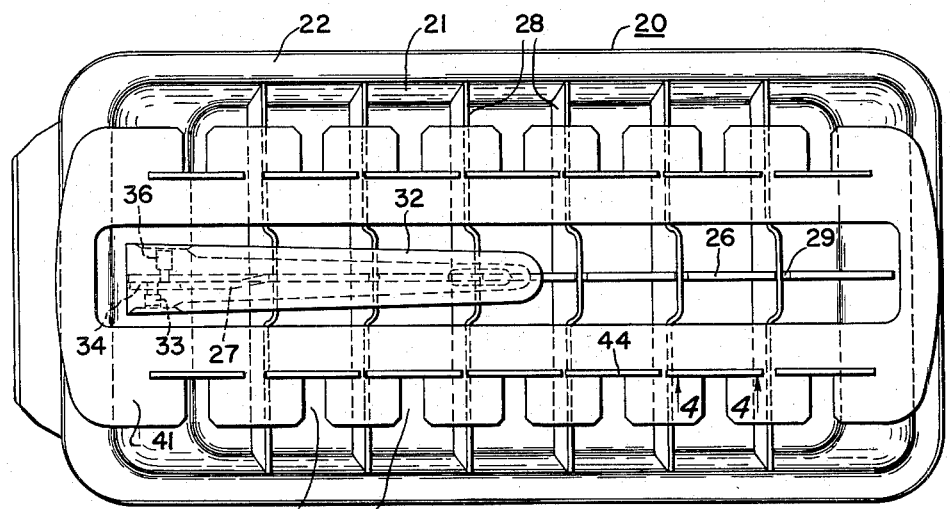
FIGURE 2 is a top view of a tray and grid type freezing device having an accessory attachment constructed in accordance with my invention removably supported on top of the device.
Figure 3:
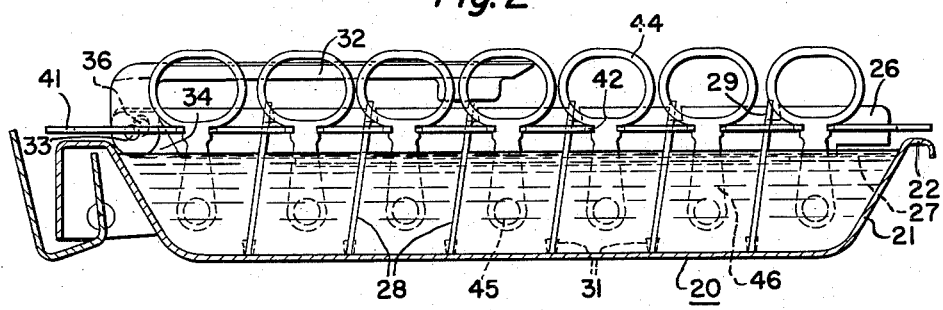
FIGURE 3 is a side view of the freezing device shown in FIGURE 2 with the tray thereof in section and containing liquid to be frozen.

Each freezing device 20 may be of any desirable or conventional construction and is preferably of the tray and grid character wherein a unitary grid structure is removably disposed in the tray thereof. These devices are now common and well known in the art and I therefore choose to illustrate my invention in connection with a freezing device including a grid of a slightly modified version of the grid disclosed in the D. H. Reeves Patent 2,219,079, dated October 22, 1940, and assigned to the assignee of this application. Briefly, each freezing device 20 includes an elongated sheet metal pan or tray member 21 provided with outwardly inclined sides and ends and having a rolled or bent over top rim 22 (see FIGURES 2 and 3). The freezing device also includes a movable or tiltable walled unitary grid member or structure removably disposed in tray 21 with walls thereof dividing the interior of the tray into compartments in which water or a flavored liquid is frozen into ice blocks or flavored ice pieces respectively. The unitary grid structure comprises a two part metal longitudinal wall or partition including a wall 26 disposed over and in vertical alignment with a wall 27 which upper wall is adapted to be shifted or impelled back and forth along the lower wall 27. A plurality of longitudinaly spaced apart substantially inflexible metal walls 28, normally inclined with respect to the vertical, extend continuously and transversely across the longitudinal grid partition and have web portions pivotally or tiltably interlocked with this partition within notches 29 and 31 provided in walls 26 and 27 respectively. A lever 32 is pivotally mounted by a stud 33 upon an upstanding ear part 34 of lower longitudinal wall 27 and is operatively connected to wall 26 by another stud 36 offset with respect to stud 34. The construction of a grid of this type is substantially conventionally as disclosed by the patent referred to and needs no further description herein.

In accordance with my invention and in order to convert a freezing device 20 from a water ice block producing device into a device for making flavored ice pieces with a finger or hand holding stick or element bonded to the ice pieces, I provide an accessory attachment for removable association with a device 20. This attachment includes a molded plastic flat frame-like plate 41 which is removably supported on the top edge surface of cross or transverse walls 28 of the grid structure (see FIGURES 2 and 3). Plate 41 has the edges of a central opening provided therein spaced from and bounding lever 32 and raised central portions of walls 28 so as not to interfere with operation of the grid structure. The outer peripheral side edges of frame-like plate 41 is provided with a series of spaced apart slots 42 extending inwardly thereof toward the longitudinal grid wall 26 and each slot has an inner closed end slightly enlarged as at 43 (see FIGURES 4 and 8). Each slot 42 is disposed or located over a compartment in a freezing device 20, formed by walls of the grid structure, with the end 43 thereof located near the top central portion of the compartments. The slots 42 provide plate 41 with or form thereon a plurality of spaced apart hanger means for a purpose to now be described. A plurality of elongated sticks or substantially key-shaped nonmetallic elements are associated with the frame-like plate 41. The stick elements may be formed of a low cost molded plastic material, wood or cardboard. Each element has an enlarged ring-shaped or handle end part 44 and a stem or shank part 46 extends therefrom. A hole 45 is provided in the shank part 46 of each of the stick elements for a purpose to be presently described. That part of each element intermediate its end part 44 and the depending shank part 46 thereof is formed or cut out as at 47 (see FIGURE 4) to provide a niche therein which is adapted to be received by walls of a slot 42 so as to guide an element therealong and to detachably interlock the elements to and suspendingly support them from plate 41. It will be noted that ring-like enlarged end parts 44 of the elements projects above plate 41 and that the shank part 46 thereof depends from this plate into the central part of a compartment of the freezing device 20 so as to immerse shank part 46 in liquid placed in a freezing device.

Assume now that one of the freezing devices 20 is to be employed for freezing separated flavored ice pieces therein within chamber 11 of refrigerator cabinet 10 to produce a plurality of so-called popsicles each bonded to one of the key-shaped nonmetallic stick elements for serving to children. The tray 21, with the grid structure removably disposed therein, receives a predetermined amount of fruit or otherwise flavored water or a flavored freezable liquid mixture to fill the compartments in the device 20 up to a given or prescribed level. A stick element is slid into each of the slots 42 in plate 41 with the niche 47 detachably interlocking the element to the plate. The niche or mounting portion 47 of the elements about the closed inner end of slots 42 so as to align the elements with one another in the enlarged end portion 43 of the slots which end portion provides a clearance between the slot and an element therein for permitting movement of the elements relative to plate 41. Frame-like flat plate 41, with the ring-shaped handle end 44 of the elements suspendingly supporting them on the plate in detachable interlocked relationship with their hanger means, is then lowered upon the freezing device 20. Plate 41 is removably mounted or supported on top of device 20 by its straddling the lever 32 and raised central portions of grid walls 28 and the plate, therefore, rests or reposes on the outer upper edges of the grid walls. The plate is free to shift lengthwise along the elongated freezing device 20 relative to tray 21 when walls of the grid structure are moved or tilted with respect to the tray and to one another. The assembly of the stick elements onto plate 41 provides or forms a removable unit supported on a device 20 with the shank part 46 of each stick element immersed in liquid contained in the compartments of the freezing device (see FIGURE 3). The liquid-filled device 20 is then placed in chamber 11 of the refrigerator 10 on liner 13 or on a shelf 19 and left therein until the flavored liquid mix is hard-frozen into a plurality of ice pieces or so-called popsicles separated from one another by the walls 27 and 28 of the grid structure. The stick elements bond to the ice pieces as the flavored liquid freezes and portions of the ice pieces within holes 45 of the elements bond together to firmly lock the pieces of ice to the elements.

Figure 5:
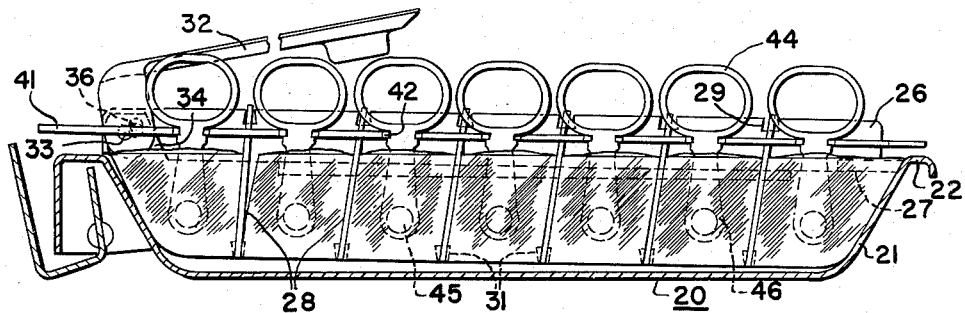
FIGURE 5 is a view of the freezing device similar to FIGURE 3 and shows frozen ice pieces loosened from walls of the tray thereof.
Figure 6:
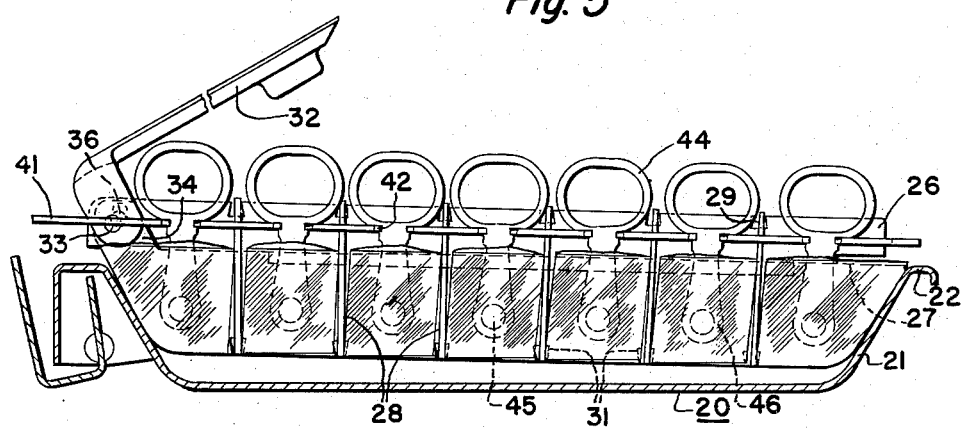
FIGURE 6 is a view similar to FIGURE 5 showing ice pieces in the freezing device loosened from grid walls thereof.

When it is desired to serve children a frozen flavored ice piece or so-called popsicle, the freezing device 20 containing same is removed from chamber 11 of the refrigerator cabinet 10 and placed on a table top or the like. Lever 32 is manually actuated or raised to cause it to swing about the mounting stud 33 and rotate stud 36 about the axis thereof, within an elongated opening provided in wall 26, so as to initiate a shifting movement of upper longitudinal wall 26 lengthwise along and relative to grid wall or partition 27 (see FIGURE 5). One wall of the notch 29 closest to lever 32 at this time engages and applies force to the forward cross wall 28 which tilts it toward the vertical and consequently moves and wedges the ice pieces in the front end of device 20 against the inclined front end wall of tray 21. This wedging action of the ice pieces causes the grid structure to be elevated within tray 21 which elevation breaks the bond between all of the ice pieces and walls of the tray as viewed in FIGURE 5 of the drawings. During this initial tilting of the end cross grid wall 28 and wedging movement of the end ice pieces, the mounting portion or niche 47 of the elements may move or pivot within the enlarged portion 43 of slots 42 so as not to interfere with the operation or swinging movement of lever 32. A continued upward swinging movement of lever 32 causes further lengthwise shifting of longitudinal wall 26 along grid wall 27 whereby the one wall of the plurality of notches 29 engages the other grid cross walls 28 one after another in succession to progressively tilt these walls toward the vertical whereby the ice compartments are enlarged and all of the ice pieces are loosened from the grid walls (see FIGURE 6). Plate 41 moves lengthwise along the grid structure as the walls 28 thereof and ice pieces therein are shifted relative to wall 27. This tilting movement of walls of the grid structure within a tray of a freezing device is conventional and is more explicitly described in prior patents. Plate 41 is supported on the grid structure and the stick elements bonded to the loosened ice pieces are suspendingly carried by the hanger means on the plate. In other words, all of the ice pieces are loosened from walls of the grid and tray but they will not fall out of the grid since the plate 41 and stick elements interlocked therewith hold the ice pieces in the grid. The grid structure, plate 41 together with ice pieces bonded to the stick elements are then removed as a unit from tray 21 of the freezing device (see FIGURE 4). While the lever 32 of this removed unit is held by one hand of the operator, his or her other hand may grasp the ring-shaped handle end 44 of the elements and slide them laterally with respect to the longitudinal grid walls 26 and 27 out of the slots 42 of plate 41 to thereby disengage a desired number of the loosened flavored ice pieces or so-called popsicles from the removed unit. Thus, the handle part of the elements bonded to the ice pieces serve to detach the mounting portion or niche 47 thereof from the hanger means or slots 42 in plate 41 for individually disengaging or removing ice pieces from the removed unit. The ring-shaped end 44 of the stick elements serve as a finger receiving handle thereon by which the flavored ice pieces can be detached from the removed unit and by which children may hold an ice piece or popsicle while it is being consumed.

From the foregoing, it should be apparent that I have provided a tray and grid type freezing device with a removable accessory attachment which increases its utility when used in conjunction with a household refrigerator cabinet. My invention permits use of a freezing device in a conventional fashion to supply ice blocks for table service which device is readily and quickly modified to produce flavored ice pieces on sticks or the like for supplying so-called popsicles. I thus eliminate the necessity of a housewife purchasing an additional freezing device different from those furnished with a refrigerator and especially designed to meet the desirability of making and serving so-called popsicles to children. The accessory attachment herein disclosed is of low manufacturing cost and is adaptable to many ice freezing devices now in public use. My freezing device modifying attachment may be distributed to users of refrigerators now installed in homes to create customer good will or it may be employed in dealers' display rooms to serve popsicles to children of visiting prospective customers in sales promotional campaigns or the like.

While the embodiment of the present invention as herein disclosed, constitutes a preferred form, it is to be understood that other forms might be adopted.

What is claimed is as follows:

In a freezing device, a tray having imperforate walls adapted to receive and retain a body of liquid therein, an open bottom grid structure removably disposed in said tray, said grid structure comprising a longitudinal wall, spaced apart flat walls inclined with respect to the vertical extending transversely across said longitudinal wall and tiltably anchored thereto, a manually actuated lever adapted to tilt said transverse walls and a plate unattached to said tray removably supported upon the top edge of said transverse grid walls in spaced relation to said lever, said grid walls cooperating with said imperforate tray walls to divide the interior of the tray into a row of compartments on each side of said longitudinal wall in which liquid contained in the device is to be congealed into separated frozen pieces, said tray walls forming the bottom and at least one upright wall of the compartments on each side of said longitudinal grid wall, each outer peripheral side edge of said plate having a series of open end slots therein extending toward said longitudinal grid wall with one of said slots disposed over each of said compartments, a plurality of elements removably associated with said plate, each of said elements having an enlarged end part, a shank part and a mounting portion intermediate said parts, said mounting portion of the elements being located in a slot of said plate to detachably hold them thereon with said enlarged end part projecting thereabove for suspendingly supporting said shank part from the plate in spaced relation to the bottom of said tray and depending into a compartment so as to be immersed in liquid therein, the freezing of liquid within said device causing the frozen pieces in said compartments to bond to said shank part of said elements, actuation of said lever tilting the transverse walls of said grid structure within and relative to the tray toward the vertical whereby to enlarge said compartments and loosen all of the frozen pieces in said device from their separating and confining tray and grid walls, said grid structure and said plate together with the frozen pieces loosened from said confining walls and bonded to said elements only being removable as a unit from said tray, said plate and the longitudinal wall of said grid, after removing said unit from said tray, preventing separation of the frozen pieces bonded to said elements in all directions from the unit other than laterally in a straight line direction away from said longitudinal grid wall, and the enlarged end part of said elements serving as a handle on the frozen pieces for sliding said mounting portion of the elements in said straight line direction sidewise with respect to said longitudinal grid wall out of the open end of said slots in said plate and for selectively removing individual loosened frozen pieces in uncovered fashion from their confining walls of the enlarged compartments of said removed unit.

References Cited in the file of this patent

UNITED STATES PATENTS

| | | |
|---|---|---|
| 1,219,711 | Devoust | Mar. 20, 1917 |
| 2,175,324 | Stamp | Oct. 10, 1939 |
| 2,360,250 | Mallard | Oct. 10, 1944 |
| 2,464,515 | Kennedy | Mar. 15, 1949 |
| 2,549,915 | McCarl | Apr. 24, 1951 |
| 2,702,011 | Larkin | Feb. 15, 1955 |
| 2,714,294 | Frei | Aug. 2, 1955 |

FOREIGN PATENTS

| | | |
|---|---|---|
| 50,547 | Denmark | Aug. 12, 1935 |
| 59,922 | Norway | Oct. 10, 1938 |